INVENTOR.
PAUL L. SCHOONOVER,
By Ethel D O'Brien
ATTORNEY.

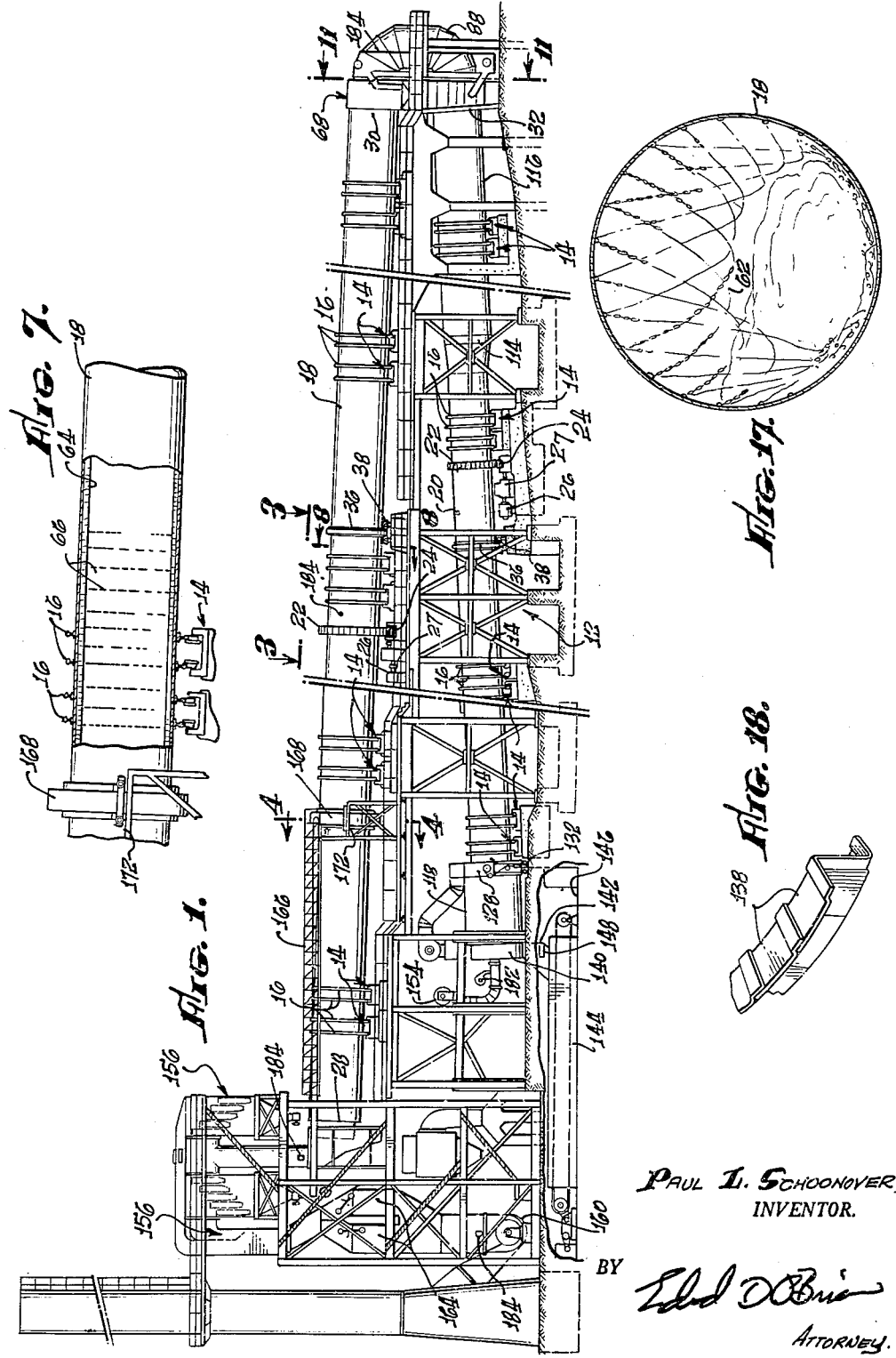

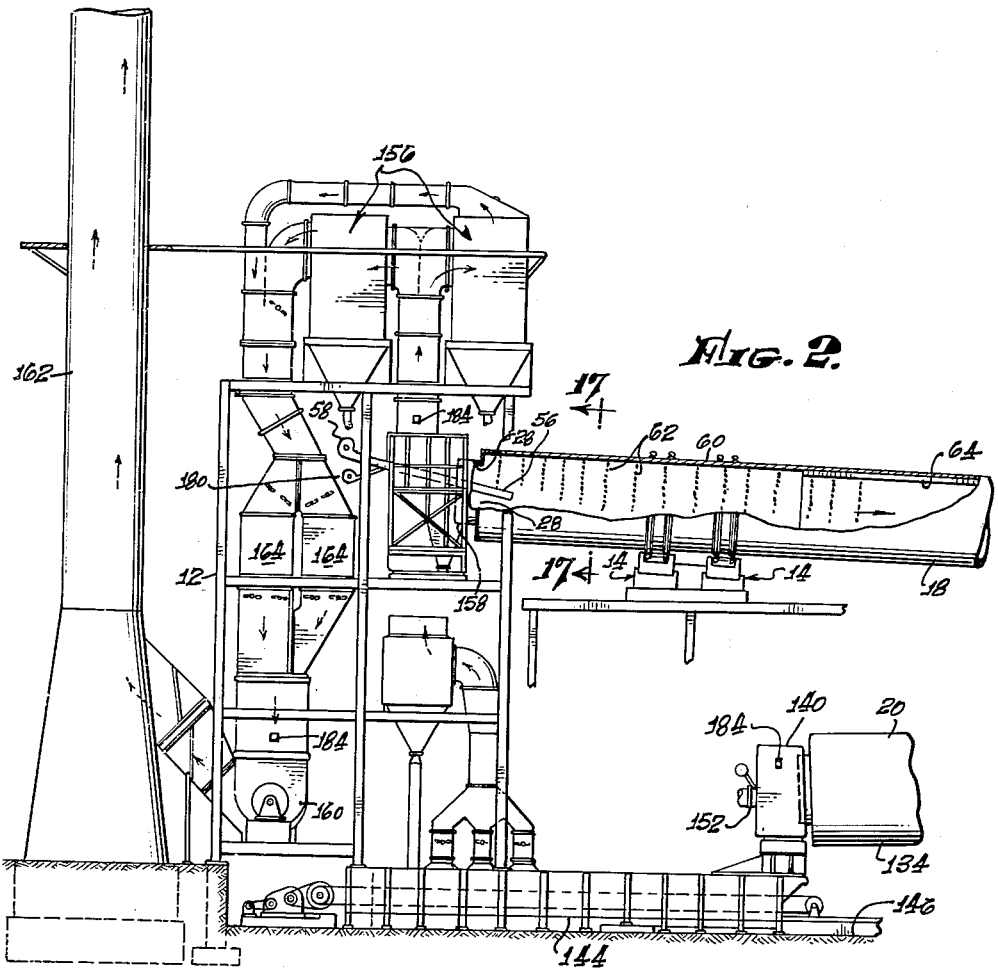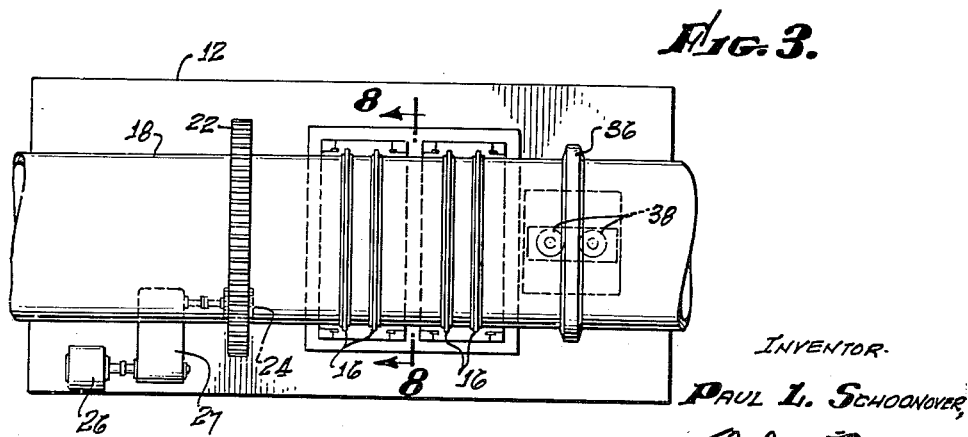

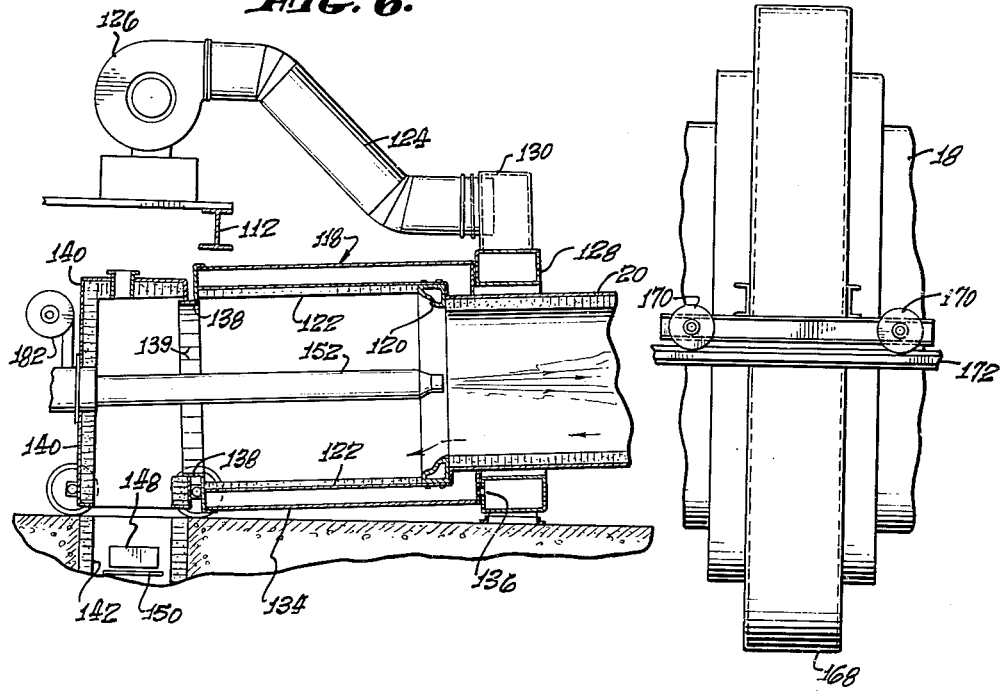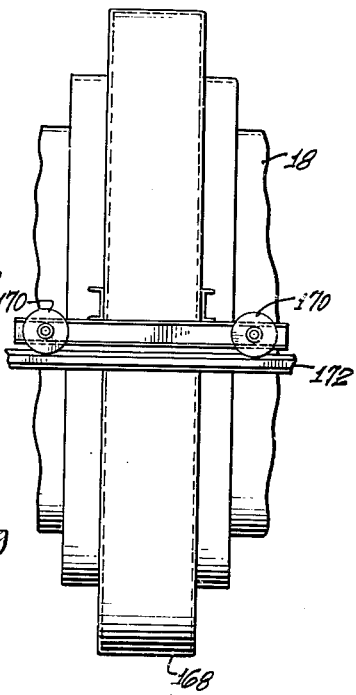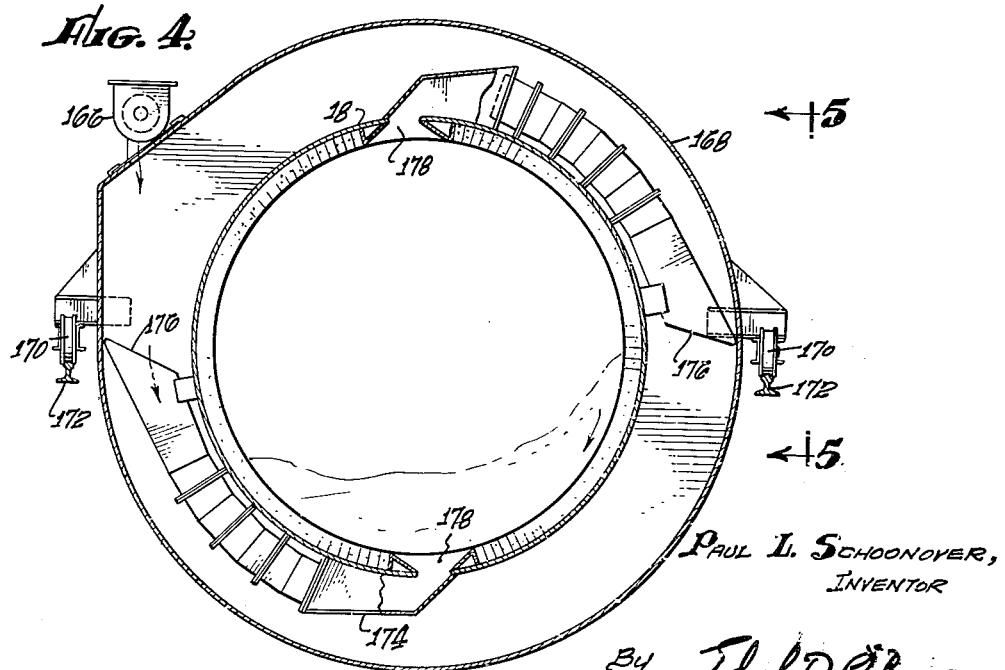

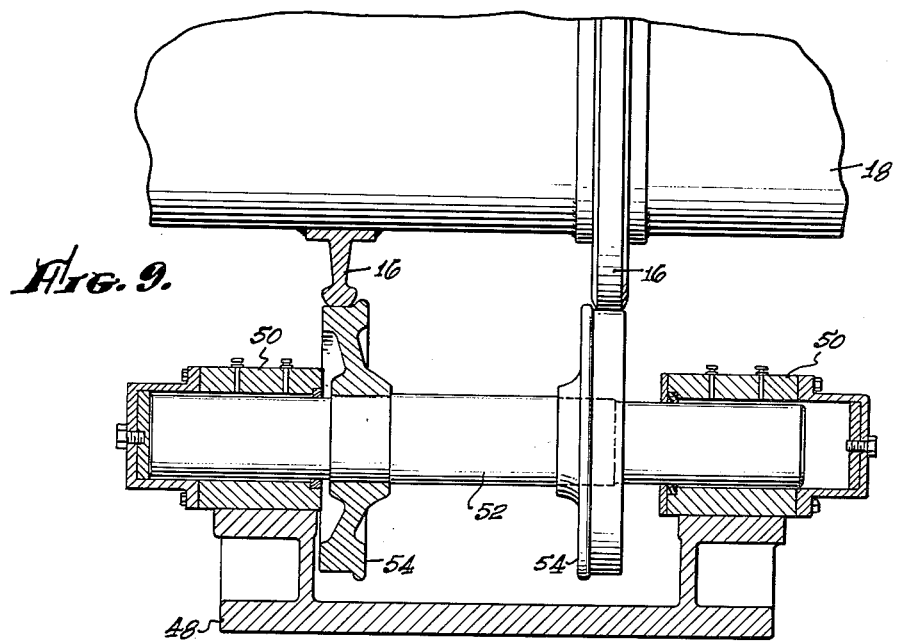
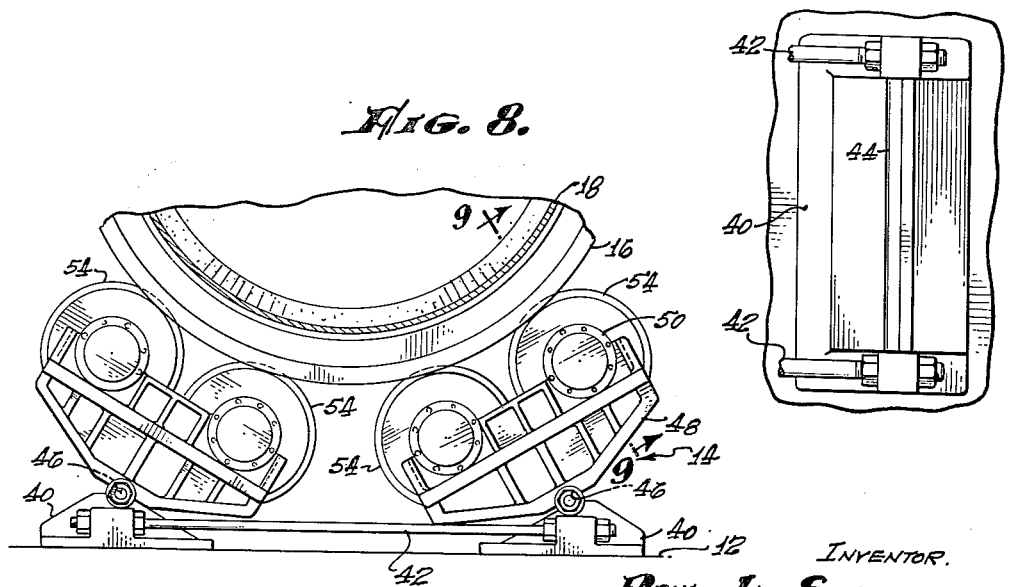

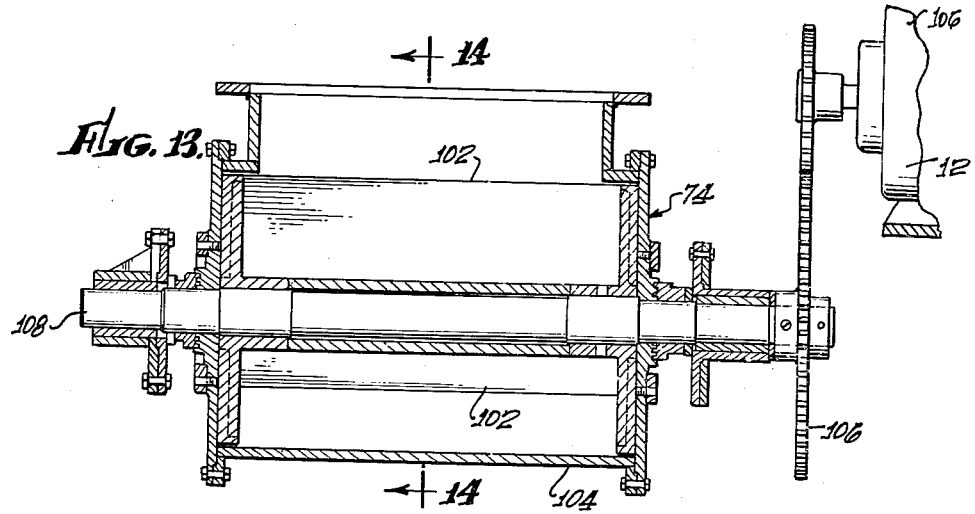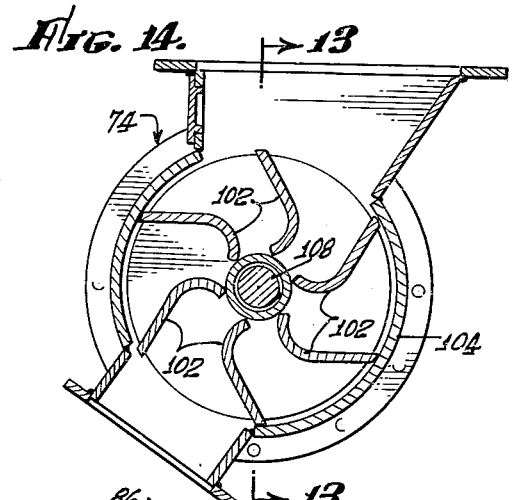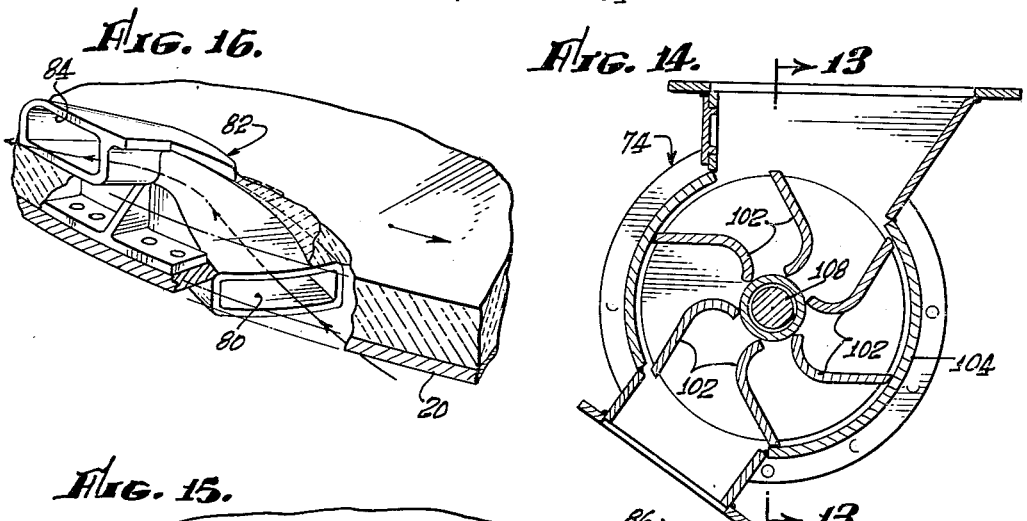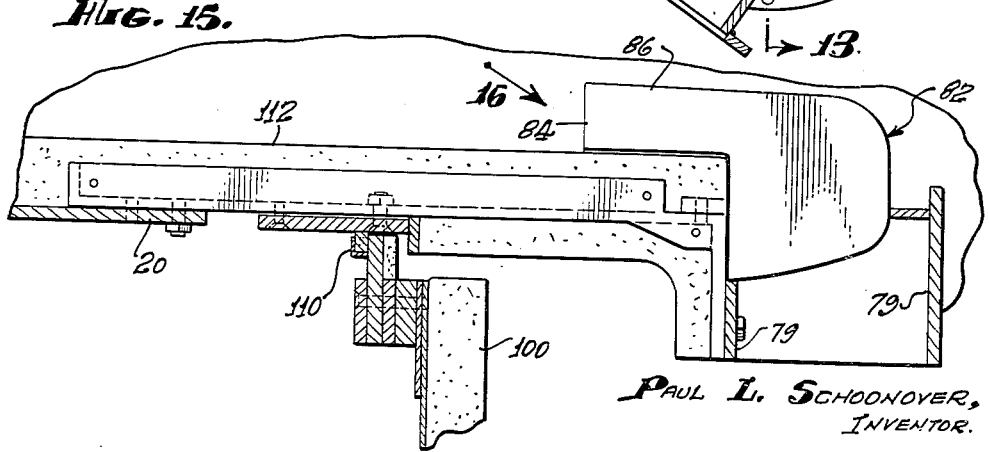

United States Patent Office 2,980,413
Patented Apr. 18, 1961

2,980,413

ROTARY KILNS

Paul L. Schoonover, Los Angeles, Calif., assignor to Monolith Portland Cement Company, Los Angeles, Calif., a corporation of Nevada Filed Apr. 4, 1957, Ser. No. 650,643

1 Claim. (Cl. 263—32)

This invention relates to new and improved rotary kilns and in particular to rotary kilns which are specifically adapted to be employed in the hydraulic or Portland cement industry.

The term "Portland cement" is commonly employed interchangeably with the term "hydraulic cement" even though this term was initially used only to designate a specific type of hydraulic cement composition manufactured by heating material obtained from a single source. Both terms are now used to designate compositions manufactured by heating a finely ground mixture of calcareous and argillaceous materials until certain chemical reactions and physical changes take place during the formation of what is commonly termed "cement clinker," and then grinding this product to a desired fineness for use. The heating operation carried out in forming a hydraulic cement is frequently referred to as "burning" or "sintering" a mixture of cement solids.

This heating operation employed in the manufacture of cement clinker is considered to be of critical nature since "under" burned cement clinker does not have the hydraulic properties normally required and since "over" burned clinker is difficult to grind. In spite of a large amount of research work aimed at facilitating the burning of cement clinker, this heating operation remains much of an art at the present time, and requires continuous control and adjustment by an operator.

In conventional cement plants the burning or heating operation is carried out utilizing relatively long rotary kilns having a metal shell serving to hold an interior heat resistant lining. Generally a refractory lining is employed since during the operation of a rotary kiln temperatures in the neighborhood of about 1400° C. are created within the lower end of it by means of a flame which causes a hot gas to flow from the lower end of the kiln to the upper end of it. During the operation of a rotary kiln the initial mixture of cement solids, or raw materials employed is introduced into the upper end of the kiln and is moved to the lower end of it by virtue of rotation of the kiln itself. In a so-called "wet" process cement plant this mixture of cement solids is in the form of an aqueous slurry whereas in a so-called "dry" process plant this mixture is in the form of a dry powder or equivalent. It will be realized from this brief description that in either type of cement plant a rotary kiln is operated essentially as a heat exchange apparatus of a counter current direct contact variety.

The heat distribution and use in a rotary kiln is extremely important to the operation of the kiln itself and to the formation of cement clinker. The temperature of the gas flowing through a conventional rotary kiln in general tends to decrease at a comparatively uniform rate. However, the heat requirements within a rotary kiln are not uniform at various stages along the length of the kiln itself. Thus, for example, in a wet process Portland cement plant the temperature of the material passing through the kiln remains relatively constant adjacent to the upper end of the kiln by virtue of the evaporation of water. In both of the types of cement plants indicated the material being treated within a kiln does not rapidly change in temperature during the time when the calcium carbonate in this material is being decomposed so as to form calcium oxide and carbon dioxide. Also, when the material passing through a rotary kiln approaches the region of the kiln adjacent to the flame employed and becomes sufficiently hot so as to start the reactions leading to the formation of certain compounds forming a vital part of hydraulic cement, heat is given off by the material in the kiln itself. These reactions occur in what is commonly referred to as the "burning zone."

Since a conventional rotary kiln is basically an extremely simple piece of apparatus one might expect that the operation of such a kiln in the cement industry would be comparatively simple. Experience has proved that this is not the case. As a conventional rotary kiln is operated the material placed within the kiln at any one instant is mixed with material already in the kiln and with material which is subsequently placed within it. Further, during processing the normal velocity of the material within the kiln itself varies depending upon the location of this material within the kiln. Thus, the normal velocity of travel of material through a rotary kiln increases to a maximum during the period when carbon dioxide gas is liberated during calcination and thence decreases as material enters the burning zone in a kiln. Similarly during the manufacture of cement the disposition of material at various points within a conventional rotary kiln varies. This is normally designated by the term "angle of repose" which indicates the angle at which the load within a kiln rests within a kiln shell as the shell is being rotated. The angle of repose of material in a rotary kiln tends to decrease gradually from the feed end of the kiln toward the zone within the kiln where calcination takes place and thence tends to increase so as to reach a maximum in the portion of the kiln where burning occurs.

In addition the operation of conventional rotary kilns is influenced by a number of secondary factors. In effect each individual rotary kiln has certain peculiarities of its own. Thus, for example, two identical kilns employed in wet process cement plants can be expected to operate differently, even on identical raw material slurries. Apparently these differences in operation are due to a number of factors such as the extent to which parts of the interior of a kiln have been worn through use, and the manner in which such parts perform their intended function within a kiln. Improper operation of a kiln frequently gives rise to rings of material within the interior of a kiln and these rings of material in turn tend to affect material and gas movement through a rotary kiln. It is not considered necessary to set forth in this specification all the various factors affecting the operation of a conventional rotary cement kiln. A large number of different types of factors such as are indicated in this discussion make the operation of a conventional kiln a comparatively involved task.

Experience has proved that it is virtually impossible to operate a rotary kiln without constant adjustment if satisfactory results are to be obtained. An operator of a conventional kiln has only a limited number of adjustments which can be made in order to provide for satisfactory burning of cement clinker. Usually the appearance and location of the burning zone within a rotary cement kiln is used by an operator as an indication as to how to control the operation of the kiln, and variables such as the rate of kiln rotation, the rate of feed to a rotary kiln and the burning temperature are adjusted in accordance with the burning zone. The burning zone of a kiln is important since it is the last region in a kiln; mistakes in burning cannot be rectified in a kiln after material passes through the burning zone and out of the kiln.

Since a conventional rotary kiln is built about a single elongated shell, all parts of which must rotate at the same rate, it is obvious that adjustment of the speed of rotation of a kiln will affect not only the burning zone of a kiln but will affect the operation of the entire kiln. In the same manner whenever any of the other variables pertaining to the operation of a rotary kiln are adjusted, the operation of the entire kiln is also affected. Thus, changes in the flame employed in the burning zone of a kiln will be reflected in temperature changes along the entire length of a kiln and hence in changes in the heating of material within the kiln. As a result of the inter-relationship between various items which may be controlled in operating a rotary kiln whenever anyone of these items is changed, secondary effects or variations occur in the kiln itself. The presence and consequences of such secondary effects normally require continuous control of kiln operation by an operator.

All of these effects and changes tend to point up certain inherent limitations of conventional rotary kilns built about a single, elongated shell. These kilns are comparatively difficult to control so as to provide a uniform product. Further, because of the inter-relationships of various items affecting the operation of a rotary kiln it is considered obvious that many factors affecting kiln performance are not susceptible to change by an operator in order to provide for efficient operation at all points within a rotary kiln in accordance with the conditions in various areas within a kiln. Thus, for example, when a rotary kiln is operated with primary reference to the appearance and location of the burning zone in the kiln it is obvious that an operator cannot control the kiln with primary reference to promoting effective operation in the region of the kiln where the raw feed is introduced into it.

In order to achieve effective control and good heat economy in the manufacture of cement clinker a wide variety of different constructions have been proposed. Single rotary kiln shells have occasionally been made so as to have different diameters at various points along their lengths. Rotary kilns have been used in connection with auxiliary calcining equipment and/or various types of heat exchange apparatus so as to lessen the workload performed with a rotary kiln itself. Many of the various types of apparatus broadly indicated in this paragraph have not been economical to construct and operate. Other of these types of apparatus have not been completely effective for the purposes intended. In general it may be stated that experience in cement industry has indicated that a rotary kiln is the most effective and economical apparatus for manufacturing cement clinker.

A basic object of the present invention is to provide rotary kilns which are not subject to various inherent disadvantages and limitations of conventional and other rotary kilns such as are briefly indicated in the preceding discussion. A more specific object of the present invention is to provide rotary kilns which can be operated in a "flexible" manner in order to achieve good heat economy and in order to be capable of comparatively easy operation. A related object of the present invention is to provide rotary kilns in which the heating of material is carried out in a continuous, step-wise manner so that each of these steps takes place under different conditions and so that each of the steps may be individually controled as required for efficient operation. With the preferred apparatus of the invention these steps are preferably carried out in at least two separate rotary kiln sections, each of the sections being operatively joined together by means for conveying hot gases and material being treated between the individual sections employed.

In accordance with the broad teachings of this invention these sections can be operated independently of one another so as to permit a great deal of flexibility in kiln operation. Preferably these sections are operated at various clinker loadings, speeds, etc. so that within each of the sections effective processing conditions are utilized.

Another object of this invention is to provide effective, inexpensive means for rotatably supporting or mounting rotary kiln sections. A still further object of the present invention is to provide efficient, inexpensive means for transferring gas and solids between individual kiln sections, and to also provide seal means in conjunction with such transfer means so as to prevent the escape of gas between kiln sections and such transfer means. Another object of the invention is to provide transfer means of the category indicated which are employed in such a manner as to minimize dust and/or heat loss between the individual sections of a complete kiln of this invention.

Because of the nature of this invention it is not considered necessary to set forth in this specification an extremely long detailed list of all the other objects and advantages of it. Effective, efficient kilns of this invention preferably employ a number of parts not specifically indicated in the preceding objects summarizing the broadest aspects of the invention. Since such parts are indicated in the remainder of this specification together with a description of their function, specific objects of the invention indicating these parts and their functions have been omitted. Such other objects and advantages of the invention will be clearly apparent to those skilled in the art to which the invention pertains from a thorough examination and consideration of this specification including the appended claim and accompanying drawings in which:

Fig. 1 is a side elevational view of a cement kiln of this invention;

Fig. 2 is an enlarged detailed view of part of the cement kiln shown in Fig. 1, this view being partially in section;

Fig. 3 is a detail view taken in the direction of line 3—3 of Fig. 1;

Fig. 4 is a cross-sectional view taken at line 4—4 of Fig. 1;

Fig. 5 is a side elevational view taken in the direction of line 5—5 of Fig. 4;

Fig. 6 is an enlarged detail view of part of the kiln shown in Fig. 1, this view being partially in section;

Fig. 7 is an enlarged view showing a portion of a kiln section employed, this view being partially in section;

Fig. 8 is a cross-sectional view taken at line 8—8 of Fig. 1;

Fig. 9 is an enlarged view taken in the direction of line 9—9 of Fig. 8;

Fig. 10 is a top plan view of a supporting structure or base employed;

Fig. 13 is a cross-sectional view taken at line 13—13 of Fig. 11;

Fig. 14 is a cross-sectional view taken at line 14—14 of Fig. 13;

Fig. 15 is a cross-sectional view taken at line 15—15 of Fig. 11;

Fig. 16 is a perspective view taken in the direction of an arrow 16 in Fig. 15;

Fig. 17 is a cross-sectional view taken at line 17—17 of Fig. 2; and

Fig. 18 is a perspective view showing the construction of certain parts employed.

Figure 11:
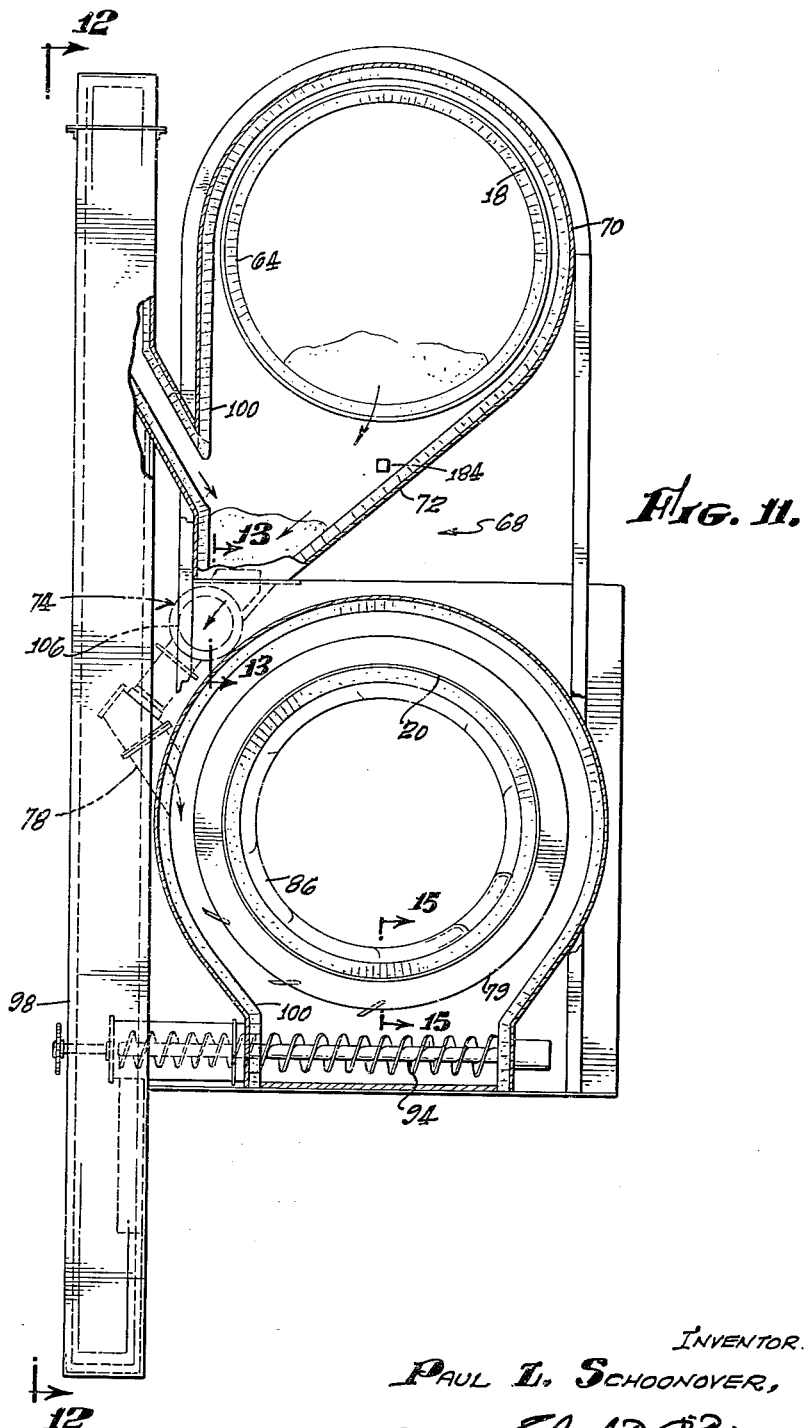
Fig. 11 is a cross-sectional view taken at line 11—11 of Fig. 1.

In all figures of the drawings like numerals are used to designate like parts. It is understood that the accompanying drawings are primarily intended so as to clearly illustrate the construction of a presently preferred embodiment of this invention. Those skilled in the art to which this invention pertains will realize that a great many changes and alterations may be made in the rotary kiln shown without departing from the essential features or principles of the invention as herein set forth and explained.

The actual details of this invention are best more fully explained by referring directly to the accompanying drawing in which there is shown a complete kiln structure 10 of the present invention which is built so as to include a supporting framework 12 of conventional type of construction that serves as a means for mounting various parts as hereinafter indicated. This framework 12 carries a plurality of identically formed carriage structures 14 such as is shown in Figs. 8, 9 and 10 of the drawing. These carriage structures in turn engage pairs of railroad rails 16 which are located so as to extend around the outsides of upper and lower cylindrical rotary kiln shells or sections 18 and 20. Each of these kiln shells is preferably formed of metal, and in general it may be stated that they resemble the shells of conventional rotary kiln except as specifically indicated herein.

Each of these kiln shells 18 and 20 is adapted to be rotated by means of a conventional ring gear 22 surrounding each of these shells being engaged by a small drive pinion gear 24 which is operatively connected to a corresponding motor 26 and speed reducer 27. An important feature of the present invention lies in the fact that the motors 26 may be operated completely independently with one another at any desired speed so that the upper and lower kiln shells 18 and 20 may be rotated independently of one another. If desired, the motors 26 may be connected together so that the two kiln shells 18 and 20 may be rotated at a fixed speed ratio with respect to one another.

It is noted that the carriage structures 14 employed are held upon the framework 12 in such a manner that the kiln shells 18 and 20 slope so that the upper kiln shell 18 has an upper or feed end 28 and a lower end 30 which is spaced immediately above and adjacent to the upper end 32 of the lower kiln shell 20. This lower kiln shell has a lower or discharge end 34. Normally it is preferred that the kiln shells 18 and 20 be mounted so that their axes are disposed several degrees from the horizontal. Movement of the kiln shells 18 and 20 along the direction of their axes is prevented by means of attached thrust flanges 36 being engaged by thrust rollers 38 mounted upon the framework 12.

Preferably the thrust flanges 36 are located at what may be termed the "centers of mean expansion" of the kiln shells 18 and 20. This term is employed to designate the fact that the locations of these flanges 36 are such that during the normal expansion of the complete kiln 10 at the temperatures normally encountered within the kiln 10 the shells 18 and 20 normally tend to expand an equal distance along their axes on each side of the respective thrust flanges 36.

The carriage structures 14 employed in order to rotatably support these kiln shells 18 and 20 are specifically designed in order to permit expansion and contraction of the shells 18 and 20 on each side of the thrust flanges 36 during the operation of the kiln 10. The structures employed for this purpose are best explained with references to Figs. 8 through 10 of the drawings. Here it is seen that the complete carriage structures 14 are each formed so as to include a pair of bases 40, and that the bases of each of the pairs are connected together by means of two parallel tie rods 42. The bases 40, of the carriage structures 14 are each provided with parallel rod-like axes 44 which engage bearing openings 46 in the center of movable supports 48.

Each of the two supports 48 in one of the carriage structures 14 includes a total of four bearings 50 and these bearings 50 are adapted to carry parallel shafts 52 in such a manner that these shafts are located parallel to the axes of the adjacent kiln shells 18 and 20. Also the shafts 52 are slidably held within the bearings 50 so as to move during expansion and contraction of the kiln shells 18 and 20. Motion as a result of such expansion and contraction is conveyed to the shafts 52 by means of the rails 16 being engaged by railroad wheels 54 which are rigidly secured to the shafts 52. It is noted that wheels 54 and the rails 16 are located in pairs so that the flanges on these wheels prevent the wheels 54 from being disengaged by or slipping off of the rails 16 during such expansion and contraction.

At the feed end 28 of the upper kiln shell 18 there is located a conventional feed pipe 56 which is mounted upon the framework 12 so as to be connected to a variable speed feed pump 58. This pipe 56 is employed in the construction illustrated so as to convey a slurry of finely ground solids capable of being heated so as to form cement clinker into a section 60 of the upper kiln shell 58 where there are provided with this kiln shell 18 chains 62 as illustrated in Fig. 17 of the drawing. These chains 62 serve to break up the material conveyed into the upper kiln shell 18 and to form nodules of this material. One of the important functions of these chains 62 is to act also to convey heat from hot gas which normally passes through the shells 18 and 20 to this raw material as water is being removed from it. They also serve to control the movement of material in the section 60 of the shell 18.

During rotation of the upper kiln shell 18 material is conveyed toward the lower end 34 of the shell 18 and during such travel is carried from the section 60 within the upper kiln shell 18 upon a heat resistant brick lining 64 such as may be formed in accordance with the various known techniques in the art to which this invention pertains. Perferably this lining 64 is constructed so as to be reinforced as indicated in the co-pending Anderson application, Serial No. 630,618, filed December 26, 1956, now Patent No. 2,895,725. A portion of this lining spaced from the section 60 of the upper kiln 18 is, as indicated in Fig. 7 of the drawings also provided with an auxiliary chain system 66 similar to the chains 62. Both of these chains systems employed within the kiln shell 18 serve in substantially the same manner to facilitate heat transfer within the kiln shell 18 and to retard what is known as flushing or rapid advance of material through the kiln shell 18.

Material passing to the lower end 30 of the upper kiln shell 18 is conveyed to the upper end 32 of the lower kiln shell 20 by transfer means 68. As will be seen from an examination of Figs. 11 and 12 of the drawing these transfer means 68 include a housing 70 mounted around the lower end 30 of the upper kiln shell 18 so that material falling out of this lower end falls directly into a chute 72 formed as an integral part of the housing 70. This chute 72 leads to a barrel valve 74 which is connected to another housing 76 surrounding the upper end 32 of the lower kiln shell 20, by means of a pipe-like chute 78.

The chute 78 directs material passing from the valve 74 between flanges 79 attached to the kiln shell 20 so as to extend around this kiln shell directly toward the inlet ends 80 of scoops 82. These scoops 82 serve to convey material into the lower kiln shell 20 in such a manner so that this material is deposited within this lower kiln shell a short distance from the upper end 32 in such a manner that substantially no dust is created. In order to accomplish this function the scoops 82 include outlets 84 which face within the lower kiln shell 20 in the direction of the material movement within this lower kiln shell. Preferably the scoops 82 are each constructed as indicated in the co-pending Schoonover application Serial No. 534,924, filed September 19, 1956, now Patent No. 2,923,538 and serve to form within the lower kiln 20 what in effect is a segmental type of ring 86 (Fig. 11) which serves to constrict gas flowing from the lower end 34 of the lower kiln shell 20 so as to contract the flow of the gas into conduit means 88 serving to convey or transfer this gas from the lower kiln shell 20 to the upper kiln shell 18.

Figure 12:
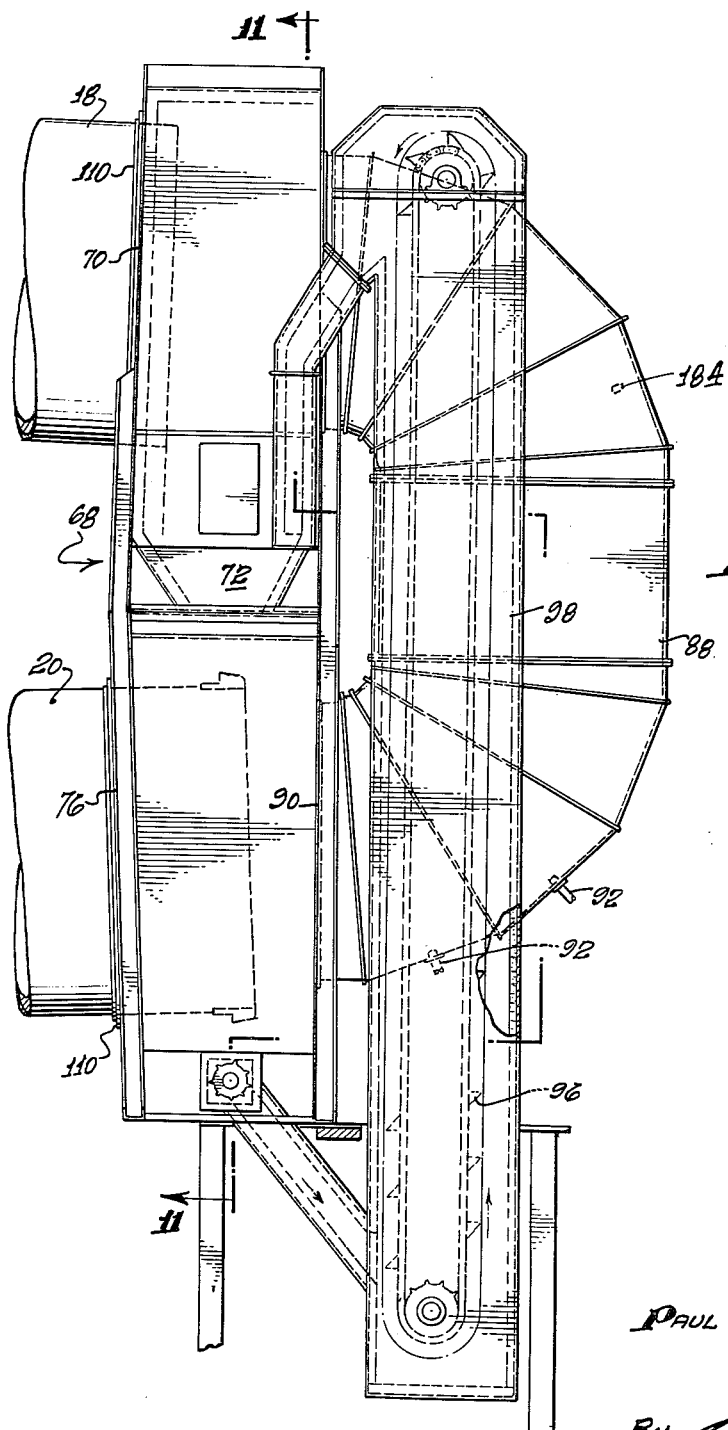
Fig. 12 is enlarged detail view of part of the cement kiln shown in Fig. 1.

As can be seen in Fig. 12 of the drawing the conduit means 88 has the essential shape of a curved elbow the ends 90 of which are directly connected so as to communicate with the sides of the housing 70 and 76 opposite the corresponding ends of the kiln shells 18 and 20. The conduit means 88 convey gas between the kiln shells 18 and 20 in such a manner that the "back pressure" or friction opposing gas flow created by it does not serve to affect to any material extent the operation of the complete kiln 10. If desired, shell air inlets 92 may be provided within the conduit means 88. Compressed air may be sent through these inlets 92 in order to prevent dust from settling or accumulating within the conduit means 88.

In addition the transfer means 68 employed with this invention include a screw conveyor 94 located at the bottom of the housing 76 so as to convey any material which may fall past the inlet ends 80 of the scoops 82 to a bucket-type conveyor 96 located in an adjacent housing 98. The conveyor 96 serves to carry any such material back into the chute 72 as illustrated in Fig. 11 of the drawing.

Preferably the interiors of the housings 70 and 76 are provided with heat resistant linings 100 which serve to protect these parts against heat loss. Normally it is not necessary to form the barrel valve 74 in this manner inasmuch as the individual vanes 102 within a valve casing 104 are capable of withstanding the heat normally encountered when formed of conventional heat resistant metals and since the comparatively small size of the valve 74 precludes any great amount of heat loss through it. The valve 74 is adapted to be actuated by a motor drive 106 (Fig. 13) which is connected to the vanes 102 by a shaft 108. This barrel valve 74 serves so as to assure the conveyance of material from upper kiln shell 18 to the lower kiln shell 20 at a uniform rate even if for some reason material should not travel through the upper kiln shell in a completely uniform manner. Thus, the barrel valve 74 in effect acts as a feed regulator for the lower kiln shell 20; an important function of it is to also prevent gas from passing in other than the desired path between the kiln shells 18 and 20. In order to prevent the loss of gas between the upper and lower kiln shells 18 and 20 rotary seals 110 are provided between the adjacent portions of these kilns shells 18 and 20 and the housings 70 and 76 as indicated in Fig. 15 of the drawing.

Preferably the lower kiln shell 20 is formed so as to include a brick lining 112 of the same category as the lining 64 previously indicated. This lining extends along the entire length of the lower kiln shell 20 past an internal shoulder 114 in this lower shell 20 connecting an enlarged section 116 formed therein adjacent to the upper end 32 of it. The lower end 34 of the lower kiln shell 20 is provided with a cooler section 118 as indicated in Fig. 6 of the drawing. This cooler section 118 is substantially of conventional design but instead of being connected to the brick lining 112 in the conventional manner is connected to this brick lining by means of hollow castings 120 (Fig. 6). These castings 120 are, as indicated in the drawings, disposed in the cooler section 118 so as to in effect constitute a ring-like shoulder leading from the lower shell 20 to the cooler section 118.

This cooler section 118 is of a cylindrical configuration and is provided with internal screens 122 which are designed so as to support cement clinker passing through the lower kiln shell 20 during such time as this clinker is being cooled by means of a stream of air. The air employed for this purpose is conveyed through a conduit 124 from a blower 126 into a ring-shaped windbox 128 which is positioned around the lower end 34 of the kiln shell 20. As indicated in Figs. 1 and 6 of the drawings a sliding type of joint 130 connects the conduit 124 to the windbox 128 and this windbox is mounted upon wheels 132 in such a manner that the force of gravity normally tends to urge it against the end of an outer shell 134 which, in effect, defines the exterior of the cooler section 118. Thus, a rotary seal is obtained between the windbox 128 and the cooler section 118 so that air from the blower 126 may pass through openings 136 in this windbox into corresponding openings designated by the same numerals in the shell 134, and thence through the screens 122.

At the lower end of the shell 134 curved, Z shaped segmental plates 138 are attached to both the shell 134 (Figs. 6 and 18) and the screens 122 in order to provide lip-type of structure for the discharge of clinker from the cooler section 118. It is noted that the plates 138 are provided with edges 139 which are lapped over one another in such a manner as to provide for expansion and contraction of these plates during operation of the kiln 10. Cement clinker traveling from the cooler section 118 is conveyed over these plates 138 to a movable housing 140 which is directly located above a chute 142 which in turn leads to a chain-type of clinker cooler 144 located in a pit 146 generally beneath the framework 12 and the cooler section 118.

The operation of the clinker cooler 144 is essentially of a conventional nature. In the event that it is necessary to shut down the clinker cooler 144 for any purpose a small door 148 is located on the side of the chute 142 and baffle means 150 are located within the chute adjacent to the door 148 so that when the door 148 is opened cement clinker will be discharged through this door into a pit (not shown) or other means for containing the clinker. Preferably the baffle means 150 are of a fixed category and when the door 148 is closed the clinker hits against these baffle means and then is deflected to the clinker cooler 144.

A burner 152 is mounted upon the framework 12 so as to extend through the housing 140 and through the clinker cooler 144 into the lower end 34 of the lower kiln shell 20. This burner is connected to a control device 154 which is specifically adapted to inject into the lower end 34 of the lower kiln shell 20 a combustible mixture of oil or gas and air or powdered coal and air in accordance with the operation of the complete kiln 10. As will be seen in the drawing (Fig. 1) this control device 154 is mounted upon the framework 12.

This framework 12 also supports dust collectors 156 which are mounted as indicated in Fig. 2 of the drawing adjacent to the feed end 28 of the upper kiln shell 18. These dust collectors are disposed so that a rotary seal 158 is formed between this end of the kiln shell 18 and them. The dust collectors 156 in turn are connected by means of a blower 160 to a conventional stack or chimney 162 for exhaust gases. Preferably heat exchangers 164 used so as to preheat combustible material employed in the burner 152 are mounted between the dust collectors 156 and the blower 160 so as to recover as much of the heat present in the exhaust gas as possible.

Dust collected by the dust collectors 156 is conveyed through a screw conveyor 166 along the top of the upper kiln shell 18 to a housing 168 which is movably mounted around this upper kiln shell upon the framework 12 by means of wheels 170 engaging rails 172 upon this framework 12. It will be realized that this housing 168 is not attached to the upper kiln shell 18 and, hence, the operation of it is not affected by expansion and contraction of the upper kiln shell 18.

Within the housing 168 there are located large scoops 174 which extend from the upper kiln shell 18 so as to have inlets 176 located closely adjacent to the internal wall of the housing 168 and so as to have outlets 178 communicating with the interior of the kiln shell 18. These scoops 174 are adapted to receive collected dust from the conveyor 166 as the kiln shell rotates and to convey this dust into the interior of this kiln shell during rotation. It is noted that the scoops 174 are mounted at the end of the section 60 of the kiln shell 18 containing the chains 62 and are spaced from the other chain system 66 within the kiln shell 18. It has been found that if decycled dust of a dry nature is returned to the interior of the upper kiln shell 18 so as to be directly engaged by chains or a chain system mounted within the shell that extensive dust loss may occur. It is noted that edges of the housing 168 fit against the upper kiln shell 18 so as to form in effect a rotary seal around this shell.

The complete kiln 10 also includes a number of other secondary devices which relate to the control of the operation of this kiln. As an example of such devices, an auxiliary pump 180 is used in connection with the feed pipe 56 so as to add additional water to the material fed to this kiln 10 so as to aid in the flow of material passing to the chains 62. Also another pump 182 connected to the burner 152 may be used so as to convey calcium chloride to the burner in order to help in volatilizing alkali during the operation of the kiln 10. Also recording temperature devices 184 are preferably located as indicated in the drawing so as to provide a continuous record of the temperatures of the material fed to the rotary kiln and the material passing through various sections of this kiln. These devices 184 are also used so as to monitor into the temperature of gas at various points within the complete kiln 10.

It is considered that the operation of the complete kiln 10 will be obvious to those skilled in the art to which this invention pertains from the aforegoing description of various parts of this kiln. During use of the kiln 10 a slurry of cement solids enters the upper or feed end 28 of the upper kiln shell 18, and as this kiln shell rotates this material is moved through the shell 18 and over the lower end 30 of it to the transfer means 68; from the transfer means 68 this material is conveyed by the scoops 82 into the upper end 32 of the lower kiln shell 20 and as the lower kiln shell 20 rotates it is conveyed past the burner 152 to the clinker cooler 144. During the rotation of these shells this material is continuously contacted and gradually heated by a hot gas stream emanating from the burner 152 and flowing through the lower kiln shell 20 to the conduit means 88 and thence to the upper kiln shell 18. This gas during travel through the kiln 10 will tend to pick up some dust from the material going through the kiln, and of course will be gradually cooled. The dust picked up by the gas will be removed from it through the dust collectors 156 prior to such gas being exhausted into the atmosphere through the stack 160.

It is important to note that with the preferred embodiment of the kiln 10 illustrated that the lower kiln shell 20 in effect has a double diameter and that the portion of this kiln shell 20 adjacent to the upper end 32 is a larger diameter than the remainder of the kiln shell 20. This increase in the diameter of the kiln shell 20 adjacent to the end 32 tends to result in a concentration of the gas stream flowing from the lower kiln shell 20 within a center portion of it adjacent to the end 32. This in turn tends to minimize dust loss from material conveyed to the kiln shell 20 from the scoops 82. Further, the ring construction 86 also tends to constrict the gas flow within this portion of the kiln shell 20 so as to aid in accomplishing this purpose. Preferably the ends of the conduit means 88 are of approximately the diameters indicated in the drawings. Under these conditions the operation of the conduit means 88 in conveying the gas flow is such that these conduit means do not convey gas in such a manner as to encourage the loss of material within a kiln as dust to the gas stream.

It is also important to note that the carriage structures 14 used in connection with the rails 16 in supporting kiln shells 18 and 20 are extremely efficient for the purpose intended. As a rotary kiln shell is heated this kiln shell will tend to expand both in a direction along the length of its axis and will tend to expand so as to increase in diameter. The supports 48 employed in the structure shown are rotatably held in such a manner that they may tilt slightly as the kiln shells employed increase in diameter to a slight extend. The functioning of the wheels 54 in conjunction with the rails 16 is not affected by such movement. Similarly the operation of the rails 16 and the wheels 54 is not affected by linear expansion of a kiln shell since the shafts 52 are held in such a manner that they slide in the bearings 50 so as to accommodate such motion without distortion or setting up unnecessary stresses and strains. The structure of the carriages 14 as employed with the kiln shells 18 and 20 is considered to be especially advantageous since these carriages provide "flexible" support at a plurality of points around these kiln shells. Such support is considered advantageous with kiln shells, especially large diameter kiln shells, in preserving kiln shape. It is considered that the means for supporting kiln shells herein shown and described serve to increase the useful life of the linings within such kilns by permitting movement in accordance with the temperatures encountered without causing binding or the like. It is also noted that the use of thrust flanges and rollers such as the flanges 36 and rollers 38 described is very effective in maintaining rotary kilns in a fixed location so as to avoid frequent adjustment such as is normally required with conventional means for rotatably mounting rotary kilns.

One of the most important features of the present invention lies in the fact that the complete kiln 10 may be operated in a step-wise manner. The motors 26 employed are preferably of the variable speed category, and with the construction shown may be "locked together" by appropriate conventional electrical means (not shown) so as to rotate the kiln shells 18 and 20 at a given speed ratio with respect to one another. Also, however, these motors may be operated completely independently of one another so that an operator can control the rotation of these shells 18 and 20 as may be desired. Further, it is noted that the control device 154 employed with the burner 152, the pump 58 employed to convey slurry to the upper kiln shell 18, the blower 126 controlling the flow of secondary air into the kiln 10, and the pumps 180 and 182 may be operated completely independently of one another, or may be "linked" by appropriate conventional electrical means (not shown) to the operation of either of the kilns 18 and 20 so as to operate at any desired speed ratio with respect to the speeds of rotation of the kiln shells 18 and 20. The temperature recording devices 184 may be conveniently used by an operator in determining how to control the operation of the various motors, pumps, and control devices indicated in the specification.

The large number of variables which may be adjusted by an operator during the use of the kiln 10 make this complete kiln a very "flexible" structure which is capable of efficient operation. In effect the kiln shells 18 and 20 may be operated independently of one another so as to achieve effective utilization of heat in the complete kiln 10. In the operation of the individual kiln shells of a complete kiln constructed in accordance with the teachings of this invention each kiln shell can be controlled so as to obtain substantially optimum processing conditions in any specific kiln shell or section. Further in the event of difficulty in the operation any one kiln shell or section, the other kiln section employed may be easily regulated so as to avoid many of the secondary or indirect consequences which would occur in a rotary kiln of conventional construction in the event of difficulty in controlling the results achieved in only one "zone" or region of the kiln.

Because of the fact that the conditions for operating a kiln such as the kiln 10 will be dependent upon a number of factors such as, for example, the sizes of the kiln shells employed, it is not considered necessary to set forth at the specification all of the details as to temperatures etc. with respect to the operation of any specific kiln 10 constructed in accordance with the teachings of this invention. Those skilled in the art to which this invention pertains are familiar with the temperatures which must be employed in kilns such as kiln 10 in manufacturing cement clinker or in treating other materials. Such individuals will be able to determine substantially optimum conditions for any treatment of material in kilns such as kiln 10 with a minimum of experimentation. It is noted, however, that in the kiln 10 the upper kiln section 18 is of larger diameter than any part of the lower kiln section 20, and that in using a kiln 10 in manufacturing cement clinker this upper kiln section is preferably operated at a different speed, kiln loading, etc. from the lower kiln section 20 so as to achieve the effective heat utilization and good control of it in accordance with the condition of the material within these sections, the temperature differentials encountered, etc.

Because of the nature of this invention and because of the fact that a number of obvious changes, additions and/or alterations may be made in the specific structure shown and described without departing from the basic features of this invention, the invention itself is considered as being limited only by the appended claim forming a part of this disclosure.

I claim:

A rotary kiln which includes: a supporting framework having upper and lower levels; upper and lower elongated, cylindrical kiln shells located at an angle to the horizontal on said upper and lower levels of said framework, respectively; means for burning fuel in the lower end portion of said lower kiln shell only; independently regulatable means for rotating said kiln shells; curved gas conduit means having an inlet opening substantially coaxial with the upper end portion of the lower kiln shell and extending between the lower end of said upper kiln shell and the upper end of said lower kiln shell to conduct the hot gases from the lower kiln shell to the upper kiln shell; means for conveying finely divided solid material from the lower end of said upper kiln shell into the upper end of said lower kiln shell, said means including a chute extending downwardly from the lower end of the upper kiln shell, an independently regulatable rotary barrel valve receiving the finely divided solid material at the lower end of said chute, housing means surrounding an upper end portion of the periphery of the lower kiln shell, a pair of spaced circumferential flanges on said lower kiln shell within said housing, conduit means communicating with said barrel valve and the space in said housing between said flanges, scoop means mounted on the lower kiln shell and extending through such kiln shell from said space to the inner periphery of such kiln shell for transferring the finely divided solid material for said space to the inner periphery of said lower kiln shell, and means for returning to said chute excess solid material not picked up by said scoop means; and rotary seal means connecting the lower end of said upper kiln shell and the upper end of said lower kiln shell with said gas conduit means and said means for conveying solid material so as to form a gas seal preventing the loss of gas between said kiln shells during the operation of said rotary kiln.

References Cited in the file of this patent

UNITED STATES PATENTS

| | | |
|---|---|---|
| 779,119 | Davey | Jan. 3, 1905 |
| 805,213 | Logan et al. | Nov. 21, 1905 |
| 854,342 | Enright | May 21, 1907 |
| 1,313,281 | Fasting | Aug. 19, 1919 |
| 1,415,990 | Carstens | May 16, 1922 |
| 1,739,383 | Bauchere et al. | Dec. 10, 1929 |
| 1,779,626 | Horn et al. | Oct. 28, 1930 |
| 1,947,789 | Miller | Feb. 20, 1934 |
| 2,027,059 | Newhouse | Jan. 7, 1936 |
| 2,066,358 | Musso | Jan. 5, 1937 |
| 2,228,618 | Warner | Jan. 14, 1941 |
| 2,269,700 | Treshow | Jan. 13, 1942 |
| 2,468,871 | Forni | May 3, 1949 |
| 2,796,249 | Plass | June 18, 1957 |